US012388195B2

(12) United States Patent
Hwang et al.

(10) Patent No.: US 12,388,195 B2
(45) Date of Patent: Aug. 12, 2025

(54) ANTENNA STRUCTURE AND ANTENNA DEVICE

(71) Applicant: DELTA ELECTRONICS, INC., Taoyuan (TW)

(72) Inventors: Chieh-Tsao Hwang, Taoyuan (TW); Siang-Rong Hsu, Taoyuan (TW); Yen-Ting Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 127 days.

(21) Appl. No.: 18/451,845

(22) Filed: Aug. 18, 2023

(65) Prior Publication Data

US 2024/0275032 A1 Aug. 15, 2024

(30) Foreign Application Priority Data

Feb. 10, 2023 (CN) ......................... 202310093286.1

(51) Int. Cl.
*H01Q 9/42* (2006.01)
*H01Q 5/364* (2015.01)
*H01Q 21/28* (2006.01)

(52) U.S. Cl.
CPC ............. *H01Q 21/28* (2013.01); *H01Q 5/364* (2015.01); *H01Q 9/42* (2013.01)

(58) Field of Classification Search
CPC .. H01Q 1/36; H01Q 1/38; H01Q 1/48; H01Q 1/50; H01Q 1/52; H01Q 5/364; H01Q 9/42; H01Q 21/00; H01Q 21/28; H01Q 23/00
See application file for complete search history.

(56) References Cited

U.S. PATENT DOCUMENTS

2006/0109179 A1 5/2006 Humpfer et al.
2011/0095947 A1 4/2011 Chou
(Continued)

FOREIGN PATENT DOCUMENTS

CN 1291522 A 4/2001
CN 101740852 A 6/2010
CN 104796173 A 7/2015
(Continued)

OTHER PUBLICATIONS

Hu Wei et al., "Dual-Band Ten-Element MIMO Array Based on Dual-Mode IFAs for 5G Terminal Applications", IEEE Access, vol. 7, Dec. 10, 2019,pp. 178476-178485.
(Continued)

*Primary Examiner* — Daniel Munoz
(74) *Attorney, Agent, or Firm* — CKC & Partners Co., LLC

(57) ABSTRACT

An antenna structure, which comprises a substrate, a ground plane and an antenna element. The substrate comprises a first surface and a second surface opposite to the first surface. The ground plane comprises a ground branch. The antenna element comprises a feed-in body, a radiating body and a short circuit part. The feed-in body is configured for receiving a feed-in signal, wherein projection of a part of the feed-in body to the first surface overlaps with the ground plane. The radiating body comprises a first radiating part and a second radiating part connected to the first radiating part. The short circuit part is connected to the second radiating part, and configured for connecting the ground plane through a via hole.

20 Claims, 15 Drawing Sheets

(56) References Cited

U.S. PATENT DOCUMENTS

| | | | | |
|---|---|---|---|---|
| 2012/0274517 | A1* | 11/2012 | Nagoshi ................. | H01Q 5/357<br>343/700 MS |
| 2013/0265207 | A1* | 10/2013 | Yukimoto ................ | H01Q 9/42<br>343/860 |

FOREIGN PATENT DOCUMENTS

| | | | |
|---|---|---|---|
| EP | 4075601 | A1 | 10/2022 |
| JP | 6241782 | B2 | 12/2017 |
| TW | 200419843 | A | 10/2004 |
| TW | I345854 | B1 | 7/2011 |
| TW | I583050 | B | 5/2017 |

OTHER PUBLICATIONS

Fujimoto et al., "Wideband printed inverted-F antenna for MIMO system", IEEE, Jul. 19, 2015, pp. 1960-1961.

* cited by examiner

ANTENNA STRUCTURE AND ANTENNA DEVICE

CROSS-REFERENCE TO RELATED APPLICATION

This application claims priority to China application No. 202310093286.1 filed on Feb. 10, 2023, which is herein incorporated by reference in its entirety.

BACKGROUND

Field of Invention

The present invention relates to an antenna structure and antenna device.

Description of Related Art

Generally, in order to meet the high requirements of the fifth generation new radio (5G NR) standard in a sub-7 GHz frequency band, an antenna needs to be further designed to handle high operating bandwidth and high isolation between antennas, so a high data rate and a high throughput of a multi-input multi-output (MIMO) system are obtained. In systems prior to the 5th generation new radio standard, the operating frequency band of the antenna is usually relatively small. Such a bandwidth requirement can be met by a general antenna design. For example, a typical inverted-F antenna type is sufficient to meet such requirements. However, in order to realize the multi-band of the fifth-generation new radio, it is usually necessary to design additional elements (e.g., three-dimensional metal plate structure). This will greatly increase form factor and cost.

SUMMARY

The invention provides an antenna structure, which comprises a substrate, a ground plane and an antenna element. The substrate comprises a first surface and a second surface opposite to the first surface. The ground plane is disposed on the first surface, wherein the ground plane comprises a ground branch. The antenna element is disposed on the second surface, wherein the antenna element comprises a feed-in body, a radiating body and a short circuit part. The feed-in body is configured for receiving a feed-in signal, wherein projection of a part of the feed-in body to the first surface overlaps with the ground plane. The radiating body comprises a first radiating part and a second radiating part connected to the first radiating part, wherein the feed-in body is connected between the first radiating part and the second radiating part, the first radiating part and the second radiating part are parallel to the ground branch, and lengths of the first radiating part and the second radiating part are equal. The short circuit part is connected to the second radiating part, and configured for connecting the ground plane through a via hole, wherein the ground branch resonates with the feed-in signal to generate a first frequency band, the first radiating part and the second radiating part resonate with the feed-in signal to generate a second frequency band, and the first radiating part resonates with the feed-in signal to generate a third frequency band.

The invention also provides an antenna device, which comprises a casing and a first antenna structure. The casing comprises a metal plane and a casing edge. The first antenna structure is vertically disposed on the metal plane, wherein the first antenna structure is adjacent to the casing edge, wherein the first antenna structure comprises a substrate, a ground plane and an antenna element. The substrate comprises a first surface and a second surface opposite to the first surface. The ground plane is disposed on the first surface, wherein the ground plane comprises a ground branch, the ground plane has a ground edge adjacent to the casing, and a separation distance is between the ground edge and the casing. The antenna element is disposed on the second surface, wherein the antenna element comprises a feed-in body, a radiating body and a short circuit part. The feed-in body is configured for receiving a feed-in signal, wherein projection of a part of the feed-in body to the first surface overlaps with the ground plane. The radiating body comprises a first radiating part and a second radiating part connected to the first radiating part, wherein the feed-in body is connected between the first radiating part and the second radiating part, the first radiating part and the second radiating part are parallel to the ground branch, and lengths of the first radiating part and the second radiating part are equal. The short circuit part is connected to the second radiating part, configured for connecting the ground plane through a via hole, wherein when the separation distance between the antenna element and the metal plane is equal to a preset distance, the ground branch resonates with the feed-in signal to generate a first frequency band, the first radiating part and the second radiating part resonate with the feed-in signal to generate a second frequency band, and the first radiating part resonates with the feed-in signal to generate a third frequency band, wherein the first frequency band, the second frequency band and the third frequency band respectively have a first radiation pattern coverage rate, a second radiation pattern coverage rate and a third radiation pattern coverage rate, when the separation distance between the antenna element and the metal plane is smaller than the preset distance, the first frequency band has a fourth radiation pattern coverage rate, wherein the fourth radiation pattern coverage rate in the first frequency band is higher than the first radiation pattern coverage rate, and when the separation distance between the antenna element and the metal plane is larger than the preset distance, the third frequency band has a fifth radiation pattern coverage rate, wherein the fifth radiation pattern coverage rate is higher than the third radiation pattern coverage rate.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
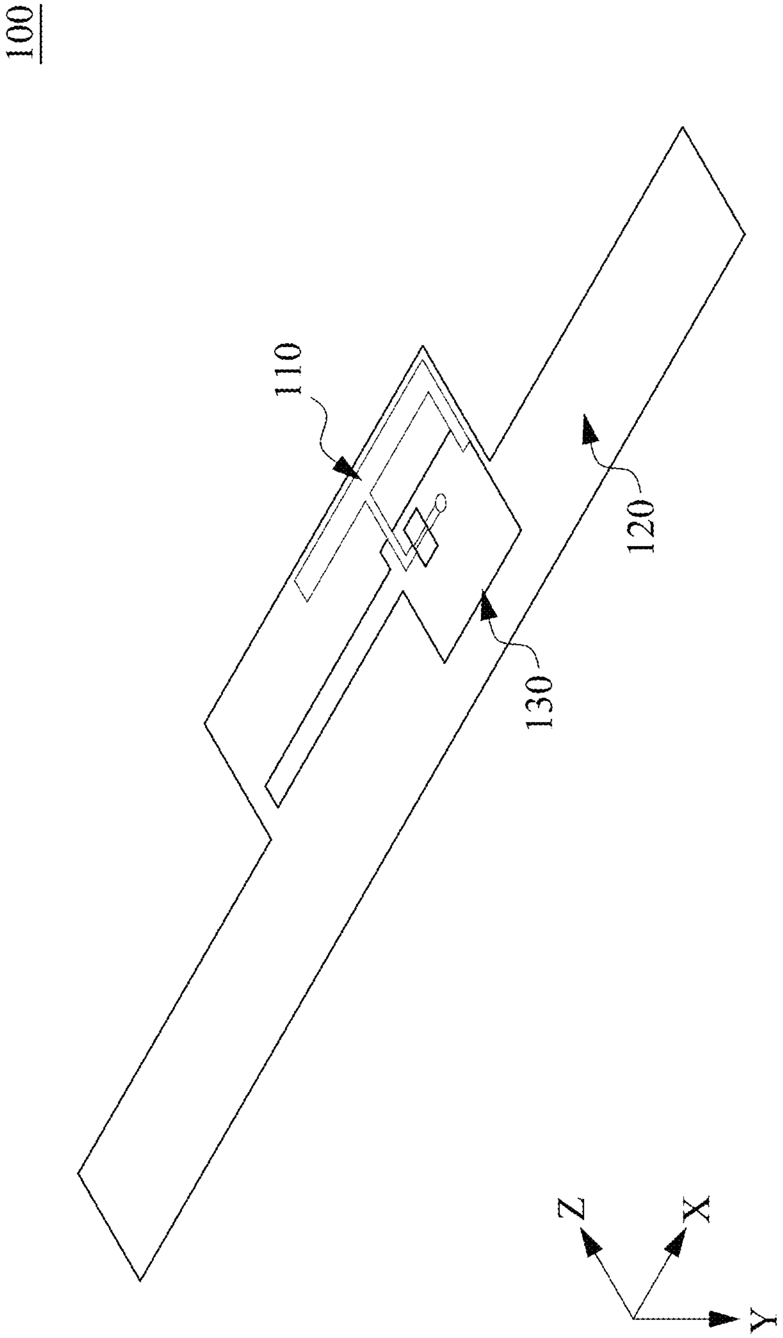
FIG. 1 is a top oblique perspective view of an antenna structure shown in some embodiments of the disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
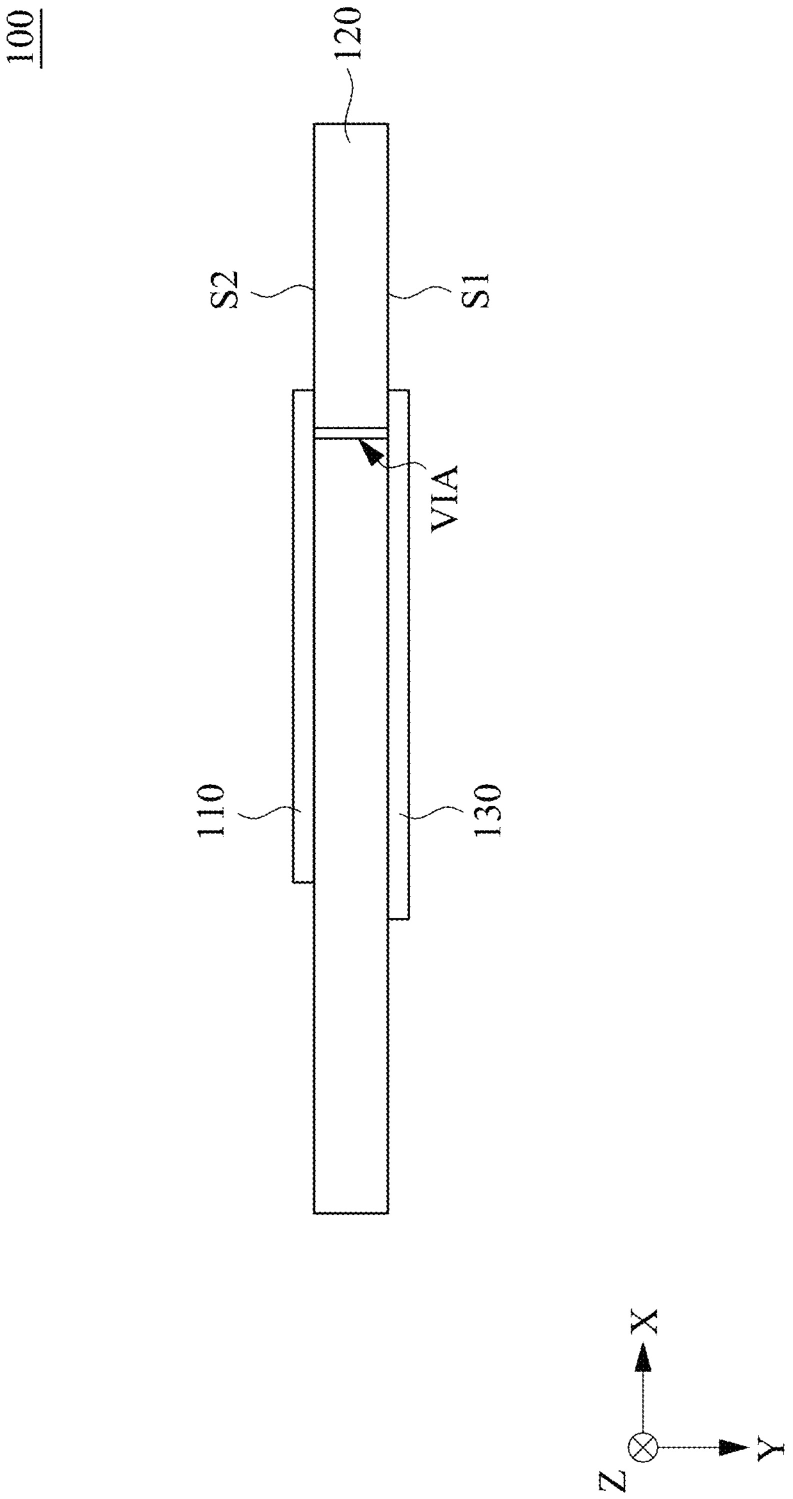
FIG. 2 is a side view of the antenna structure shown in some embodiments of the disclosure.

Reference is made to FIG. 1 and FIG. 2, where FIG. 1 is a top oblique perspective view of an antenna structure 100 shown in some embodiments of the disclosure, and FIG. 2 is a side view of the antenna structure 100 shown in some embodiments of the disclosure. As shown in FIG. 1, the antenna structure 100 includes an antenna element 110, a substrate 120 and a ground plane 130. Both the antenna element 110 and the ground plane 130 are disposed on the substrate 120. In some embodiments, the antenna element 110 and the ground plane 130 can be made of metal materials such as copper foil. In some embodiments, a material of the substrate 120 can be Teflon (PTFE) or epoxy resin (FR4), which is commonly used to manufacture PCBs.

Moreover, as shown in FIG. 2, in this embodiment, the substrate 120 includes a first surface S1 and a second surface S2 opposite to the first surface S1. The ground plane 130 is disposed on the first surface S1. The antenna element 110 is disposed on the second surface S2. The antenna element 110 is connected to the ground plane 130 through the substrate 120 by a via hole VIA.

Figure 3:
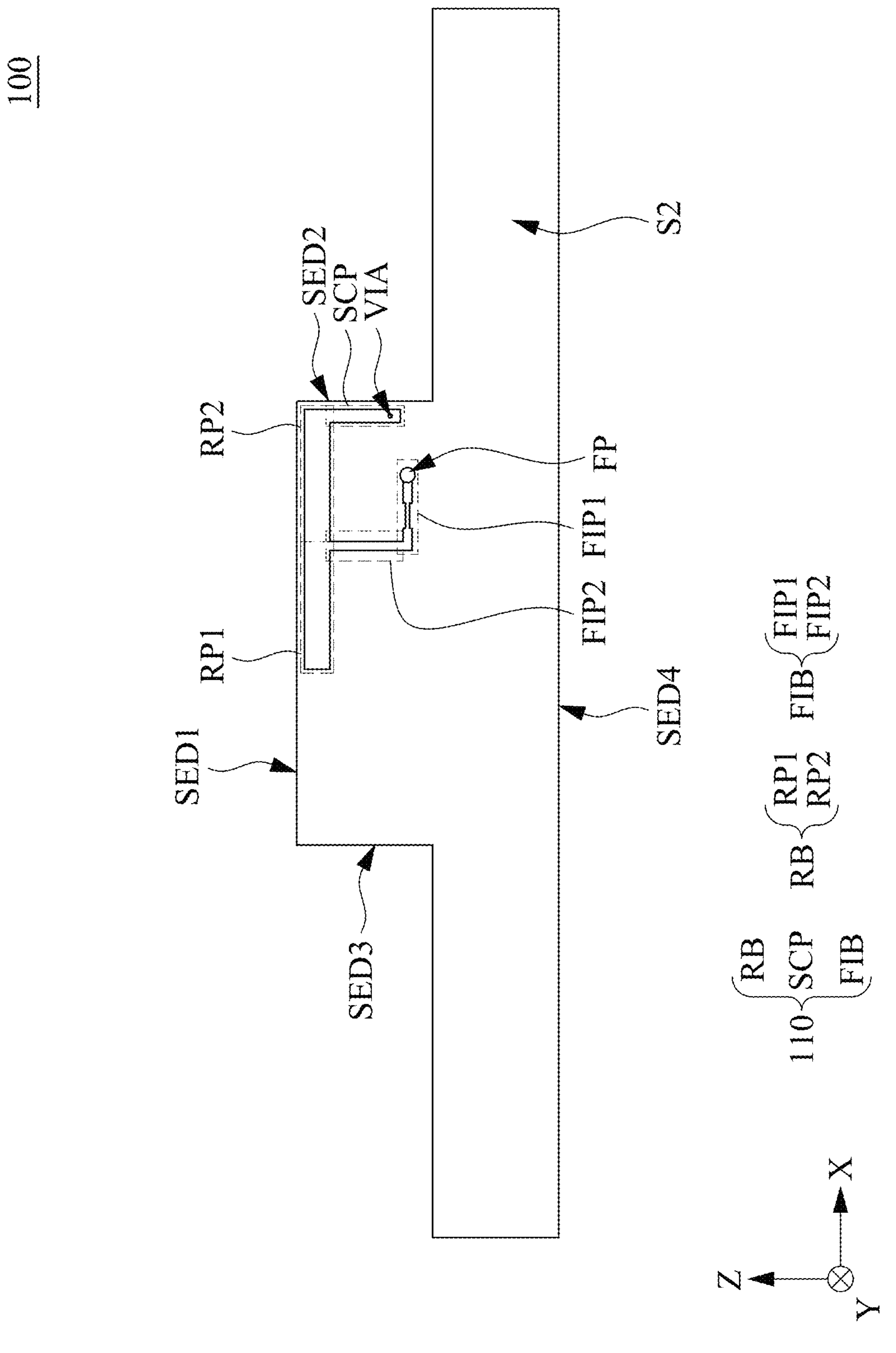
FIG. 3 is a top view of the antenna structure shown in some embodiments of the disclosure.

Reference is made to FIG. 3 together, which is a top view of the antenna structure 100 shown in some embodiments of the disclosure. As shown in FIG. 3, looking down on the antenna structure 100 in a y direction, the antenna element 110 on the second surface S2 includes a radiating body RB, a feed-in body FIB, and a short circuit part SCP. The radiating body RB includes a first radiating part RP1 and a second radiating part RP2 connected to the first radiating part RP1, the feed-in body FIB is connected between the first radiating part RP1 and the second radiating part RP2, and lengths of the first radiating part RP1 and the second radiating part RP2 are equal. The feed-in body FIB is used for receiving a feed-in signal. The short circuit part SCP is connected to the second radiation part RP2. In some embodiments, the feed-in body FIB includes a feed-in point FP, and the feed-in point FP can be used for receiving the feed-in signal. In some embodiments, the short circuit part SCP includes a via hole VIA, and can be connected to the ground plane 130 through the substrate 120 by the via hole VIA. In other words, the antenna element 110 is an inverted-F antenna structure.

In some embodiments, the substrate 120 can include a first substrate edge SED1, a second substrate edge SED2, a third substrate edge SED3, and a fourth substrate edge SED4, the first substrate edge SED1 can be perpendicular to the second substrate edge SED2 and the third substrate edge SED3, and the first substrate edge SED1 can be parallel to the fourth substrate edge SED4.

In some embodiments, a distance between the radiating body RB and the first substrate edge SED1 is much smaller than a distance between the radiating body RB and the fourth substrate edge SED4. In other words, the radiating body RB can be adjacent to the first substrate edge SED1. In some embodiments, a distance between the short circuit part SCP and the second substrate edge SED2 is much smaller than a distance between the short circuit part SCP and the third substrate edge SED3. In other words, the short circuit part SCP can be adjacent to the second substrate edge SED2.

In some embodiments, a disposition direction of the radiating body RB can be parallel to the first substrate edge SED1 and the fourth substrate edge SED4, and be perpendicular to the second substrate edge SED2 and the third substrate edge SED3. In some embodiments, the disposition direction of the short circuit part SCP can be parallel to the second substrate edge SED2 and third substrate edge SED3, and be perpendicular to the first substrate edge SED1 and fourth substrate edge SED4.

In some embodiments, the feed-in body FIB includes a first feed-in part FIP1 and a second feed-in part FIP2, the first feed-in part FIP1 is connected to the second feed-in part FIP2, the second feed-in part FIP2 is connected between the first radiating part RP1 and the second radiating part RP2, and the first feed-in part FIP1 and the second feed-in part FIP2 are perpendicular to each other. In some embodiments, the first feed-in part FIP1 includes a feed-in point FP, and can receive the feed-in signal through the feed-in point FP. In some embodiments, a disposition direction of the first feed-in part FIP1 can be parallel to the first substrate edge SED1 and the fourth substrate edge SED4, and be perpendicular to the second substrate edge SED2 and the third substrate edge SED3. In some embodiments, a disposition direction of the second feed-in part FIP2 can be parallel to the second substrate edge SED2 and the third substrate edge SED3, and be perpendicular to the first substrate edge SED1 and the fourth substrate edge SED4.

Figure 4:
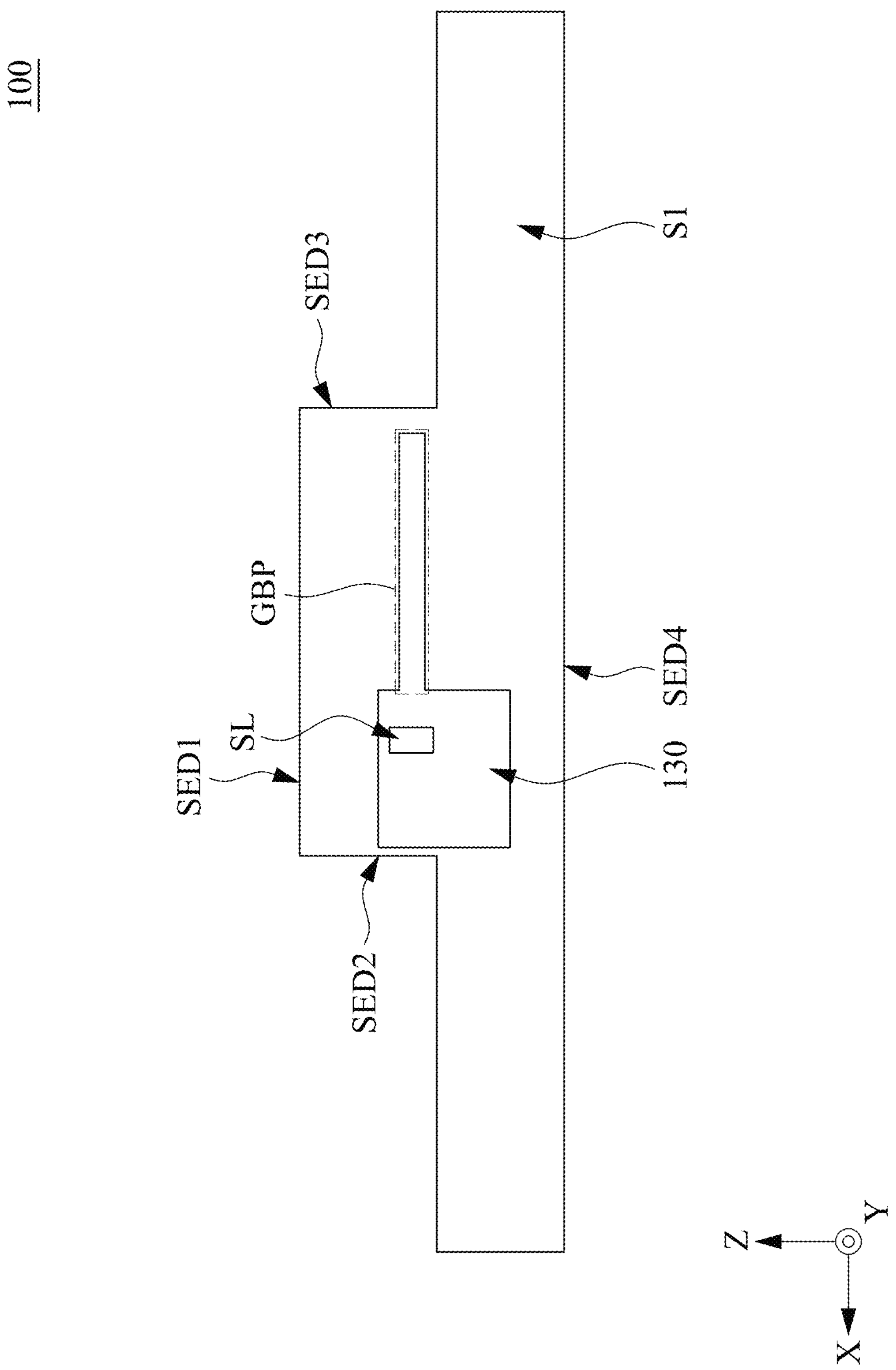
FIG. 4 is a bottom view of the antenna structure shown in some embodiments of the disclosure.

Reference is made to FIG. 4 together, which is a bottom view of the antenna structure 100 shown in some embodiments of the disclosure. As shown in FIG. 4, looking up at the antenna structure 100 in a −y direction, the ground plane 130 on the first surface S1 includes a ground branch GBP. In some embodiments, the ground plane 130 includes a slot SL. In some embodiments, a distance between an end of the ground branch GBP and the second substrate edge SED2 is much larger than a distance between the end of the ground branch GBP and the third substrate edge SED3. In other words, the ground branch GBP can be adjacent to the third substrate edge SED3. In some embodiments, a disposition direction of the ground branch GBP can be parallel to the first substrate edge SED1 and the fourth substrate edge SED4, and be perpendicular to the second substrate edge SED2 and the third substrate edge SED3.

Figure 5:
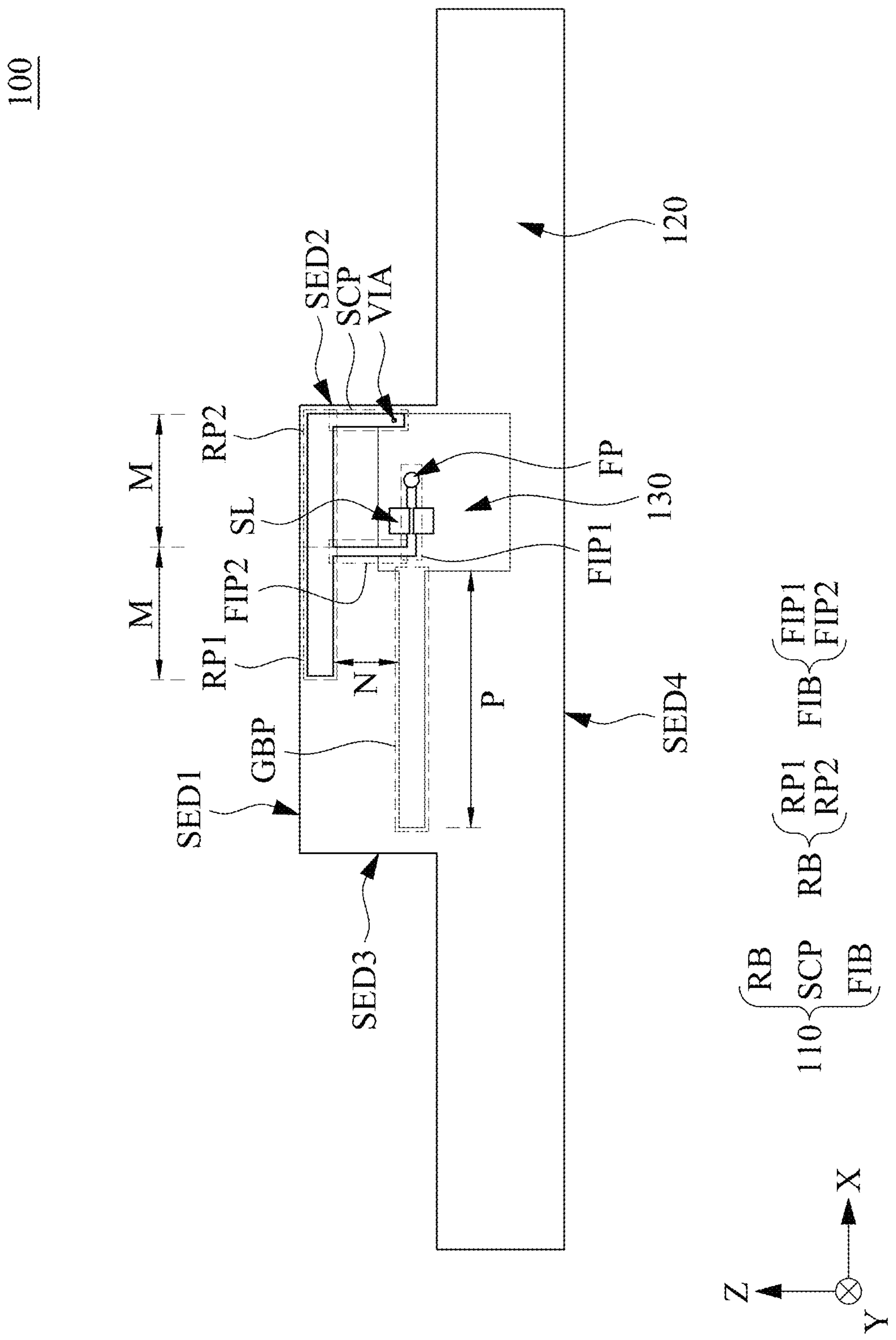
FIG. 5 is a top perspective view of an antenna structure according to some embodiments of the disclosure.

Reference is made to FIG. 5 together, which is a top perspective view of an antenna structure 100 according to some embodiments of the disclosure. As shown in FIG. 5, projection of the feed-in body FIB to the first surface S1 overlaps with the ground plane 130. In some embodiments, projection of the first feed-in part FIP1 in the feed-in body FIB to the first surface S1 can overlap with the ground plane 130, and projection of a part of the second feed-in part FIP2 in the feed-in body FIB to the first surface S1 can overlap with the first surface S1. In some embodiments, projection of a part of the short circuit part SCP to the first surface S1 can overlap with the ground plane 130.

In this embodiment, the first radiating part RP1 and the second radiating part RP2 are parallel to the ground branch GBP. In some embodiments, projections of the first radiating part RP1 and the second radiating part RP2 to the first surface S1 might not overlap with the ground plane 130, and projection of another part of the second feed-in part FIP2 to the first surface S1 might not overlap with the ground plane 130, projection of another part of the short-circuit part SCP to the first surface S1 might not overlap with the ground plane 130. In some embodiments, projection of a part of the first feed-in part FIP1 to the first surface S1 can overlap with the slot SL of the ground plane 130, and width of the part of the first feed-in part FIP1 can be narrower than width of other part of the first feed-in part FIP1. With such disposition, they can be regarded as a matching circuit, so that impedance of the antenna structure is close to 50 ohms of the feed-in point.

In this embodiment, the ground branch GBP resonates with the feed-in signal to generate a first frequency band, and the first radiating part RP1 and the second radiating part RP2 resonate with the feed-in signal to generate a second frequency band, and the first radiating part RP1 resonates with the feed-in signal to generate the third frequency band. In some embodiments, the third frequency band is higher than the second frequency band, and the second frequency band is higher than the first frequency band. In other words, through the resonance of the ground branch GBP, the antenna structure 100 can operate in a low frequency band, with the resonance of the first radiating part RP1 and the second radiating part RP2, the antenna structure 100 can operate in an middle frequency band, and with the resonance of the first radiating part RP1, the antenna structure 100 can operate in a high frequency band (e.g., a center frequency of the low frequency band (i.e., the first frequency band) can be 3.3 GHz, a center frequency of the middle frequency band (i.e., the second frequency band) can be 4.2 GHz, and a center frequency of the high frequency band (i.e., the third frequency band) can be is 5 GHz). In other words, such a structure will resonate an ultra-wide frequency band (e.g., 3.2 GHz-5.5 GHz).

In some embodiments, a length P of the ground branch GBP can be a quarter wavelength of the first frequency band. In some embodiments, a length M of the first radiating part RP1 and the length M of the second radiating part are both one-eighth wavelength of the second frequency band. In some embodiments, a minimum distance N can be between the projection of the first radiating part RP1 to the first surface S1 and the ground branch GBP, and a length of the minimum distance N is a difference between a quarter wavelength of the third frequency band and an one-eighth wavelength of the second frequency band. In other words, the length P of the ground branch GBP, the length M of the first radiating part RP1, the length M of the second radiating part and the minimum distance N can be adjusted according to operating frequency band requirements of the antenna, so as to enable the antenna structure 100 to operate in a required frequency band.

Figure 6:
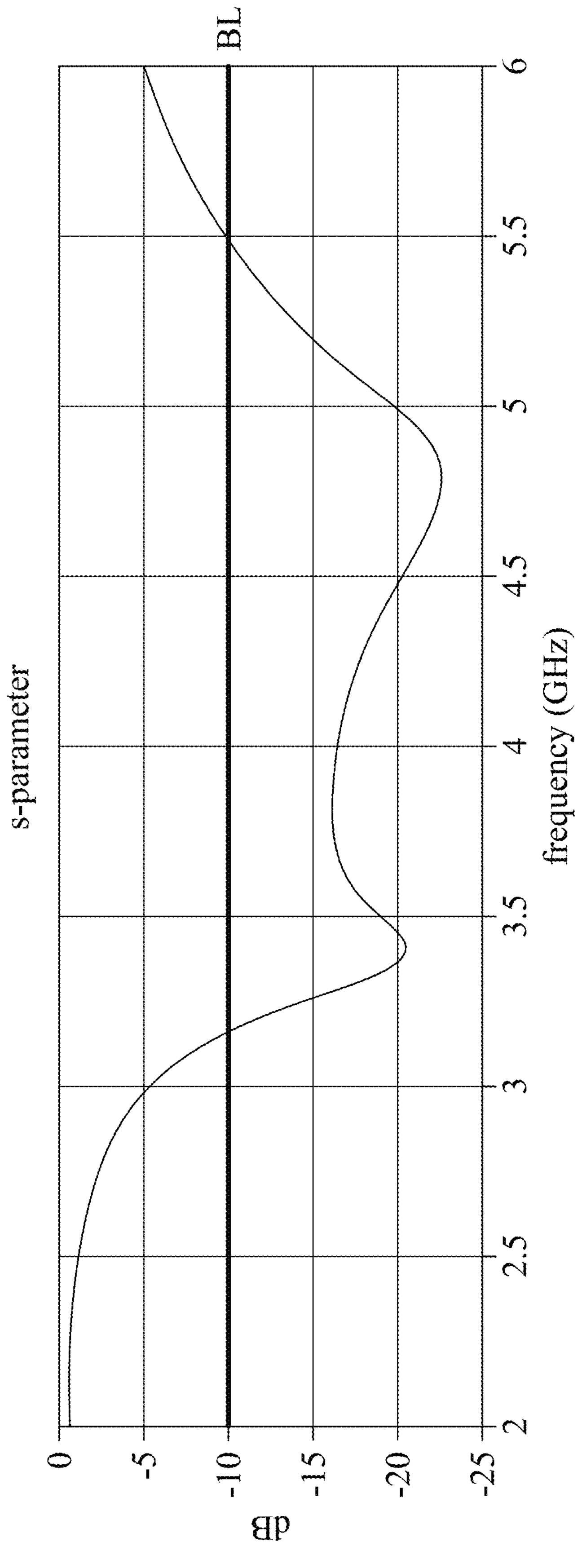
FIG. 6 is a schematic diagram of the operating frequency band of reflection loss of the antenna structure shown in some embodiments of the disclosure.

Reference is made to FIG. 6 together, which is a schematic diagram of the operating frequency band (reflection coefficient (s-parameter) and frequency) of reflection loss of the antenna structure 100 shown in some embodiments of the disclosure. As shown in FIG. 6, with −10 dB as a reference line BL, the operating frequency band resonated by the antenna structure 100 is 3.1-5.5 GHz through the structure of the above-mentioned antenna structure 100. In other words, the antenna structure 100 can resonate the ultra-wide frequency band to meet the operating frequency band requirements of a fifth generation wireless communication technology antenna.

With the above-mentioned antenna structure 100, the three resonant frequency bands can be resonated by the inverted-F antenna structure 100 and the ground plane 130 having the ground branch GBP. This will greatly increase the operating frequency band of the antenna structure 100 to overcome the problem that the operating frequency band of the antenna of the fifth generation wireless communication technology is too small. In addition, the length P of the ground branch GBP, the length M of the first radiating part RP1, the length M of the second radiating part and the minimum distance N can be adjusted according to the operating frequency band requirements, so as to achieve the requirement that the antenna operates in the required frequency band conveniently and quickly.

Figure 7:
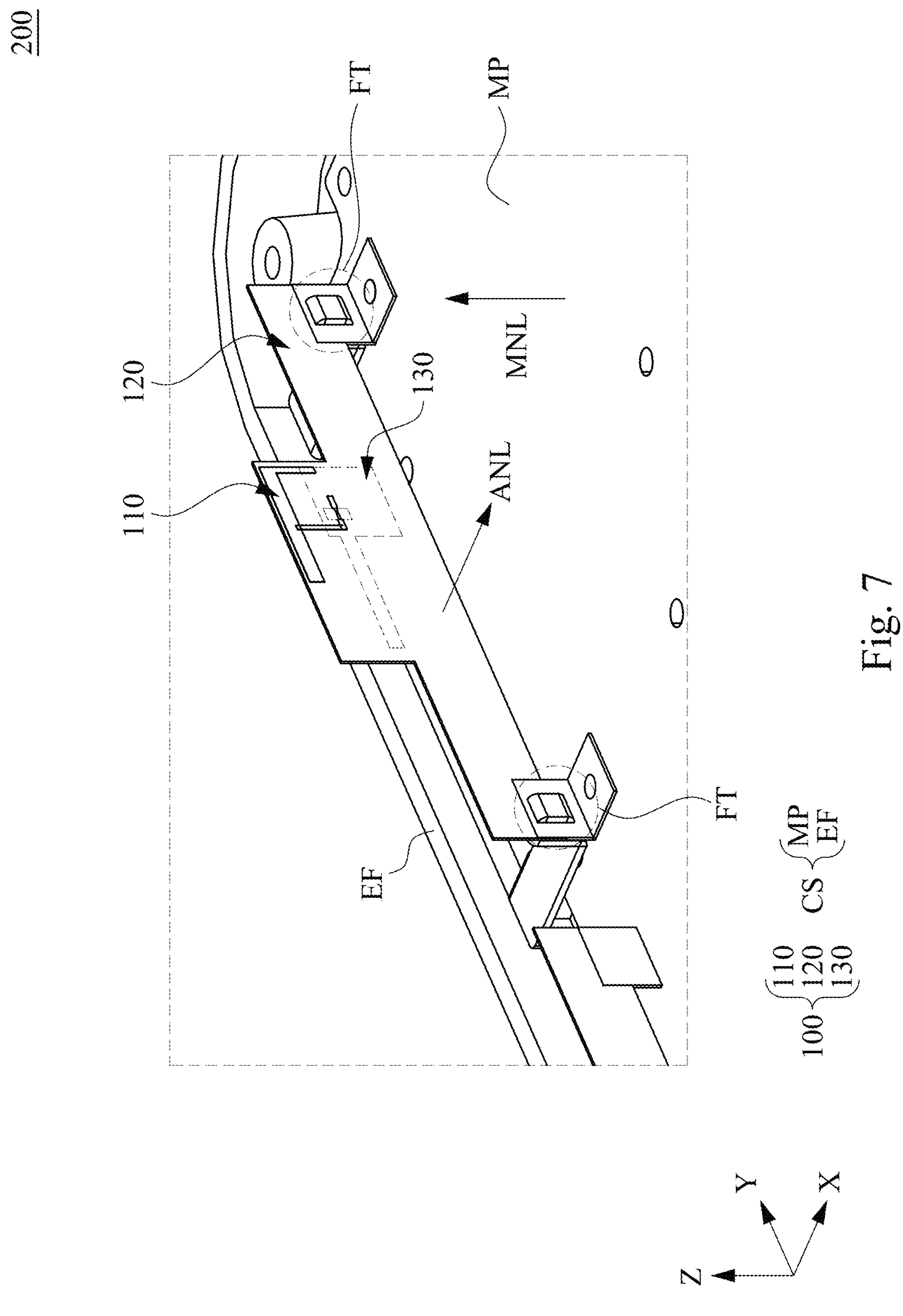
FIG. 7 is a schematic diagram of an antenna device shown in some embodiments of the disclosure.

Reference is made to FIG. 7 together, which is a schematic diagram of an antenna device 200 shown in some embodiments of the disclosure. As shown in FIG. 7, the antenna device 200 includes an antenna structure 100 and a casing CS. The casing CS includes a metal plane MP and a casing edge EF. The antenna structure 100 is vertically disposed on the metal plane MP, where the antenna structure 100 is adjacent to an edge EF of the casing. In other words, the entire plane of the antenna element 110, the substrate 120 and the ground plane 130 (i.e., a normal direction ANL is a x direction) is perpendicular to the entire metal plane MP (i.e., a normal direction MNL is a z direction), the antenna element 110, the substrate 120, and the ground plane 130 are adjacent to the casing edge EF, and the substrate 120 will be fixed on the metal plane MP. In some embodiments, the substrate 120 can be directly fixed on the metal plane MP by using a fixture FT. In some embodiments, the casing CS can be realized by any metal material. It should be noted that the antenna structure 100 disposed on the case CS also has the same structure as the above-mentioned antenna structure 100 in FIGS. 1 to 5, so details are not repeated here.

Figure 8:
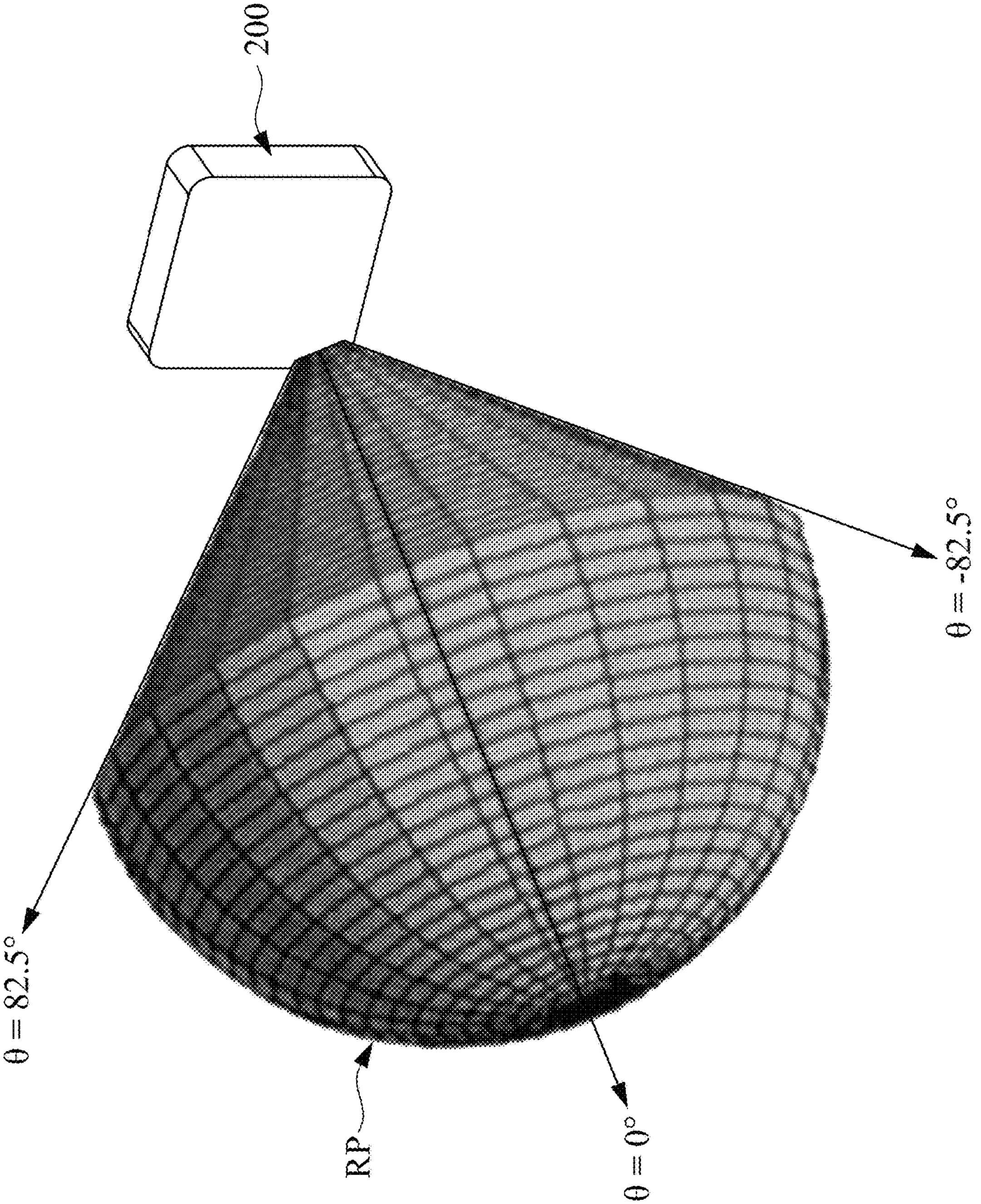
FIG. 8 is a schematic diagram of a radiation pattern generated by the antenna device shown in some embodiments of the disclosure.

Reference is made to FIG. 8 together, which is a schematic diagram of a radiation pattern RP generated by the antenna device 200 shown in some embodiments of the disclosure. As shown in FIG. 8, a normal direction of the metal plane MP of the casing CS is the z direction, and the antenna structure 100 generates the radiation pattern RP approximately hemispherical in the z direction. Taking the positive z direction as a reference (i.e., as 0 degree), the radiation pattern RP is concentrated at a plane angle of 82.5 degrees to −82.5 degrees. In other words, the radiation pattern RP generated by the antenna device 200 covers an area between plus and minus 82.5 degrees. It can be seen that the antenna device 200 not only has an extremely wide operating frequency band, but also can maintain an excellent radiation pattern coverage. For example, the area of interest, i.e., a radiation pattern coverage rate with directivity >0 dBi between plus and minus 82.5 degrees reaches more than 80%.

Figure 9:
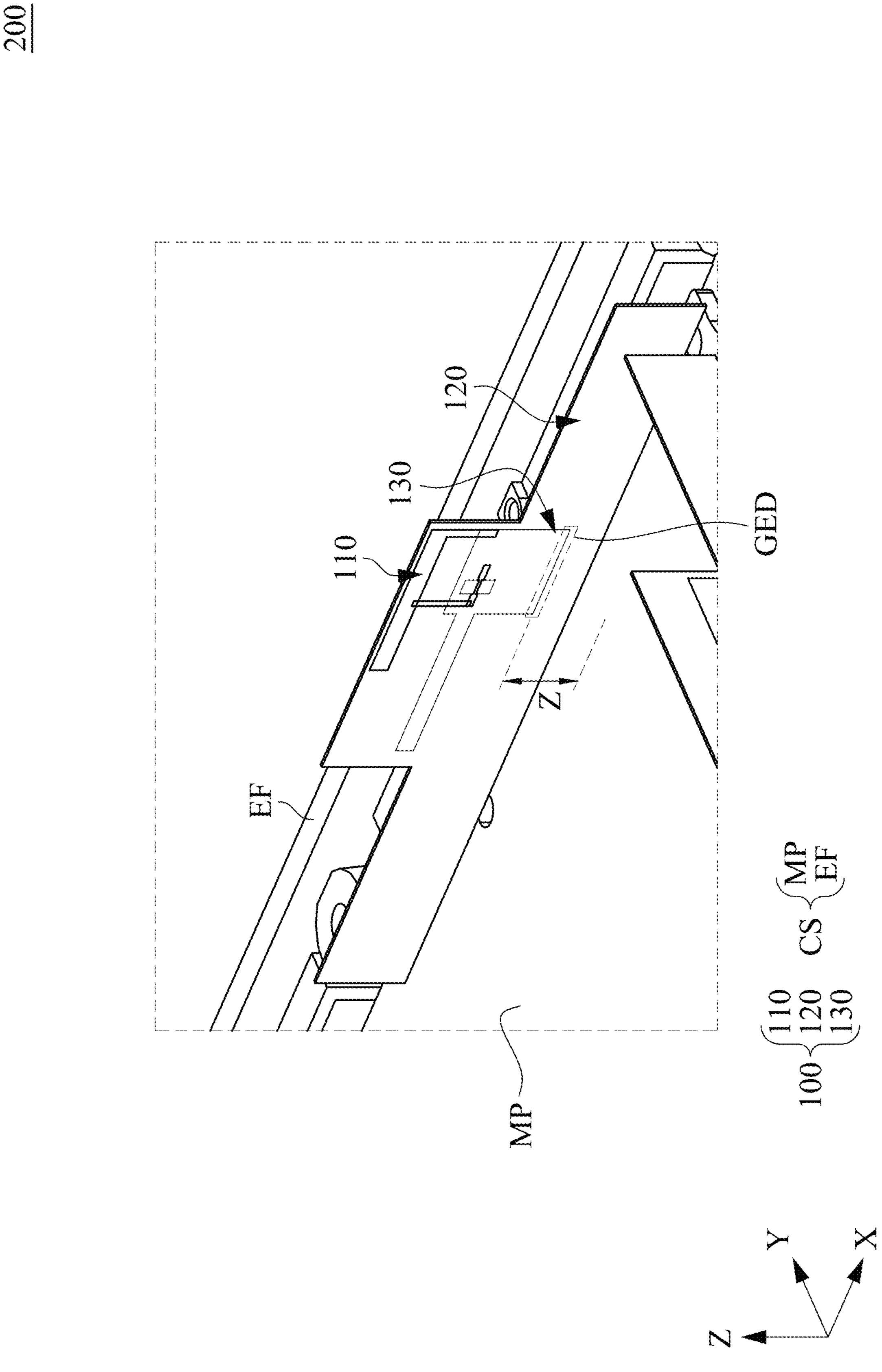
FIG. 9 is a schematic diagram of a separation distance Z shown in some embodiments of the disclosure.

Reference is made to FIG. 9 together, which is a schematic diagram of a separation distance Z shown in some embodiments of the disclosure. As shown in FIG. 9, the ground plane 130 in the antenna structure 100 has a ground edge GED adjacent to the casing CS with the separation distance Z between the ground edge GED and the casing CS. In other words, a minimum distance between the ground edge GED and the casing CS is this separation distance Z.

In this embodiment, when the separation distance Z is equal to a preset distance, the ground branch GBP resonates with the feed-in signal to generate the first frequency band, the first radiating part RP1 and the second radiating part RP2 resonate with the feed-in signal to generate the second frequency band, and the first radiating part RP1 resonates with the feed-in signal to generate the third frequency band. When the separation distance Z is equal to the preset distance, there is a good radiation pattern coverage rate (i.e., greater than 80%) for the frequency band of 3.3 GHz-5 GHz. Furthermore, the first frequency band, the second frequency band and the third frequency band all have a radiation pattern coverage rate higher than 80%. The first frequency band, the second frequency band and the third frequency band respectively have the first radiation pattern coverage rate, the second radiation pattern coverage rate and the third pattern coverage rate, and the first radiation pattern coverage rate, the second radiation pattern coverage rate and the third pattern coverage rate are all higher than 80%. When the separation distance Z is smaller than the preset distance, there is a more optimized radiation pattern coverage rate (i.e., a higher radiation pattern coverage rate) for a n78 frequency band (the first frequency band). Furthermore, the first frequency band has a fourth radiation pattern coverage rate higher than the first radiation pattern coverage rate. When the separation distance Z is larger than the preset distance, there is a more optimized radiation pattern coverage rate (i.e., a higher radiation pattern coverage rate) for a n79 frequency band (the third frequency band). Furthermore, the third frequency band has a fifth radiation pattern coverage rate higher than the third radiation pattern coverage rate.

For example, assuming that the preset distance is set to 8.1 mm in advance, the antenna structure 100 in the antenna device 200 can resonate the first frequency band of 3.3 GHz, the second frequency band of 4.2 GHz and the third frequency band of 5 GHz. Therefore, it can meet requirements of the n78 (or n77) and n79 frequency bands of the fifth-generation wireless communication technology, and an angle is between plus and minus 82.5 degrees, and each frequency band also has a good radiation pattern coverage rate (about 80%).

When the separation distance Z is adjusted to 5.1 mm, the antenna structure 100 in the antenna device 200 can resonate the first frequency band of 3.3 GHz, the second frequency band of 4.2 GHz and the third frequency band of 5 GHz, and it can meet the requirements of the n78 and n79 frequency bands of the fifth-generation wireless communication technology. For the n78 frequency band, the angle is between plus and minus 82.5 degrees, and there is a more optimized radiation pattern coverage (about 89%).

When the separation distance Z is adjusted to 13.1 mm, the antenna structure 100 in the antenna device 200 can resonate the first frequency band of 3.3 GHz, the second frequency band of 4.2 GHz and the third frequency band of 5 GHz, and it can meet the requirements of the n78 and n79 frequency bands of the fifth-generation wireless communication technology. For the n79 frequency band, the angle is between plus and minus 82.5 degrees, and there is a relatively optimized radiation pattern coverage (about 87%).

It should be noted that, although the above is an example of setting one antenna structure 100 in the casing CS, however, in practical applications, more than one antenna structure 100 can be disposed in the casing CS. In the following, a practical example will be used to describe the disposition of multiple antenna structures 100 in the casing CS.

Figure 10:
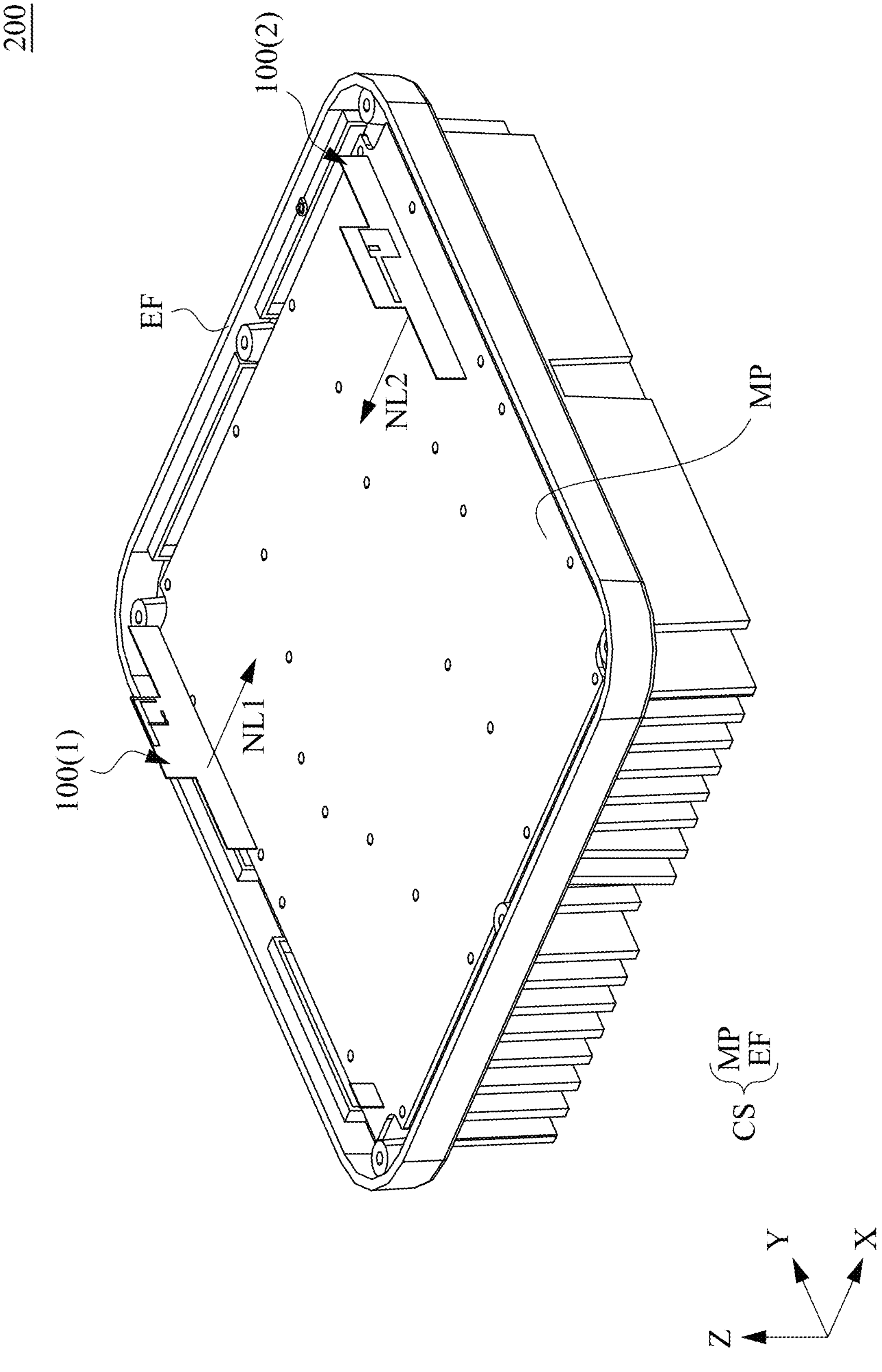
FIG. 10 is a schematic diagram showing positions of two antenna structures in the casing according to some embodiments of the disclosure.

Reference is made to FIG. 10 together, which is a schematic diagram showing positions of two antenna structures 100(1)-100(2) in the casing CS according to some embodiments of the disclosure. As shown in FIG. 10, the antenna device 200 includes antenna structures 100(1)-100(2) and the casing CS. The antenna structures 100(1)-100(2) in the antenna device 200 can be disposed parallel to each other on the metal plane MP, and the antenna structures 100(1)-100(2) can all be adjacent to the casing edge EF. An angle between normal directions NL1 to NL2 of respective planes of the antenna structures 100(1)-100(2) is 180 degrees.

Figure 11:
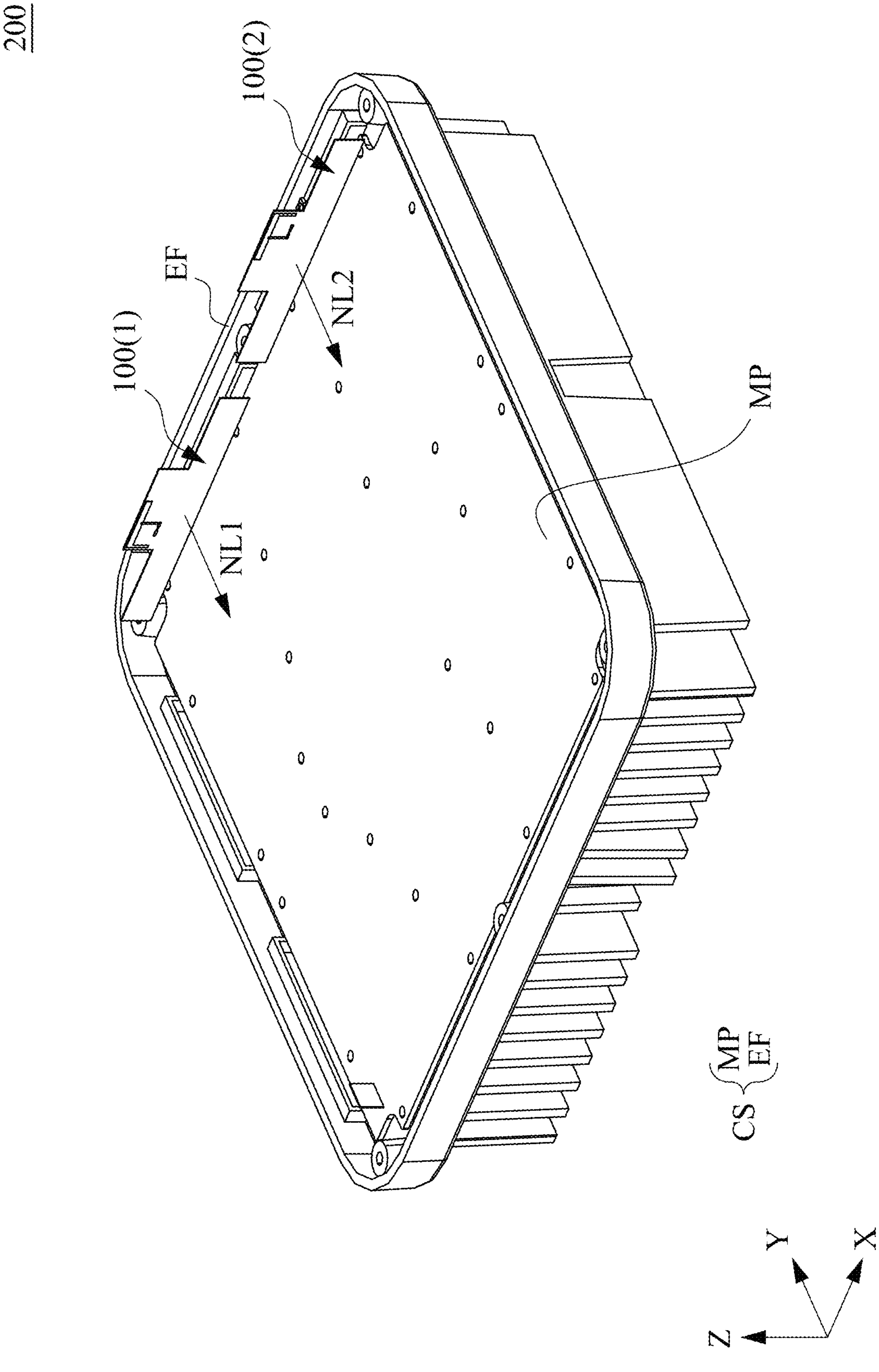
FIG. 11 together, which is a schematic diagram showing the positions of two antenna structures in the casing according to other embodiments of the disclosure.

Reference is made to FIG. 11 together, which is a schematic diagram showing the positions of two antenna structures 100(1)-100(2) in the casing CS according to other embodiments of the disclosure. As shown in FIG. 11, the antenna device 200 includes the antenna structures 100(1)-100(2) and the casing CS. The antenna structures 100(1)-100(2) in the antenna device 200 can be disposed parallel to each other on the metal plane MP, the antenna structure 100(1) is adjacent to the antenna structure 100(2), and the antenna structures 100(1)-100(2) can all be adjacent to the casing edge EF. The angle between the normal directions NL1-NL2 of the respective planes of the antenna structures 100(1)-100(2) is 0 degree.

Figure 12:
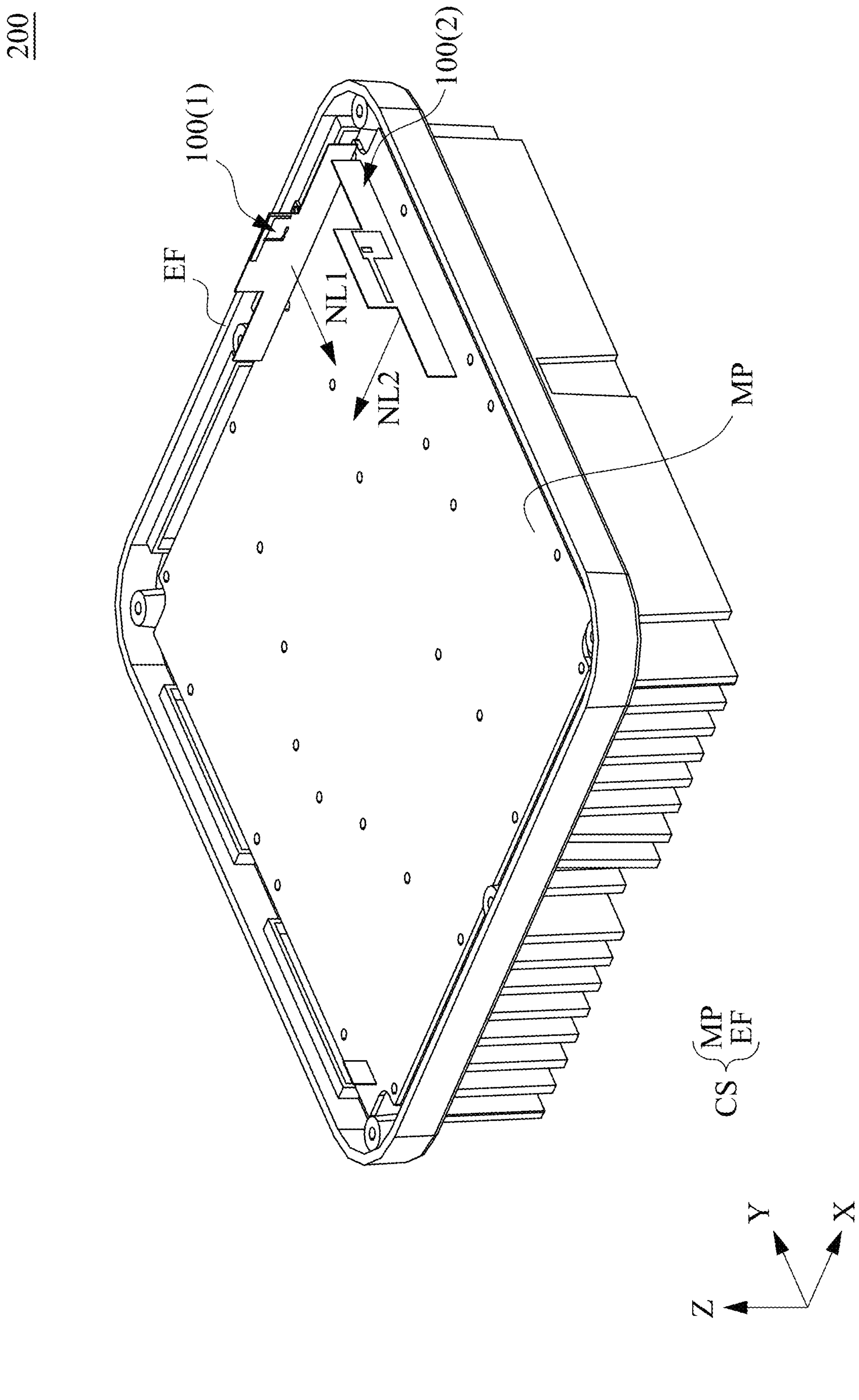
FIG. 12 is a schematic diagram showing the positions of two antenna structures in the casing according to other embodiments of the disclosure.

Reference is made to FIG. 12 together, which is a schematic diagram showing the positions of two antenna structures 100(1)-100(2) in the casing CS according to other embodiments of the disclosure. As shown in FIG. 12, the antenna device 200 includes antenna structures 100(1)-100(2) and a casing CS. The antenna structures 100(1)-100(2) in the antenna device 200 can be disposed on the metal plane MP perpendicular to each other, the antenna structure 100(1) is adjacent to the antenna structure 100(2), and the antenna structures 100(1)-100(2) can all be adjacent to the casing edge EF. The angle between the normal directions NL1-NL2 of the respective planes of the antenna structures 100(1)-100(2) is 90 degrees.

Figure 13:
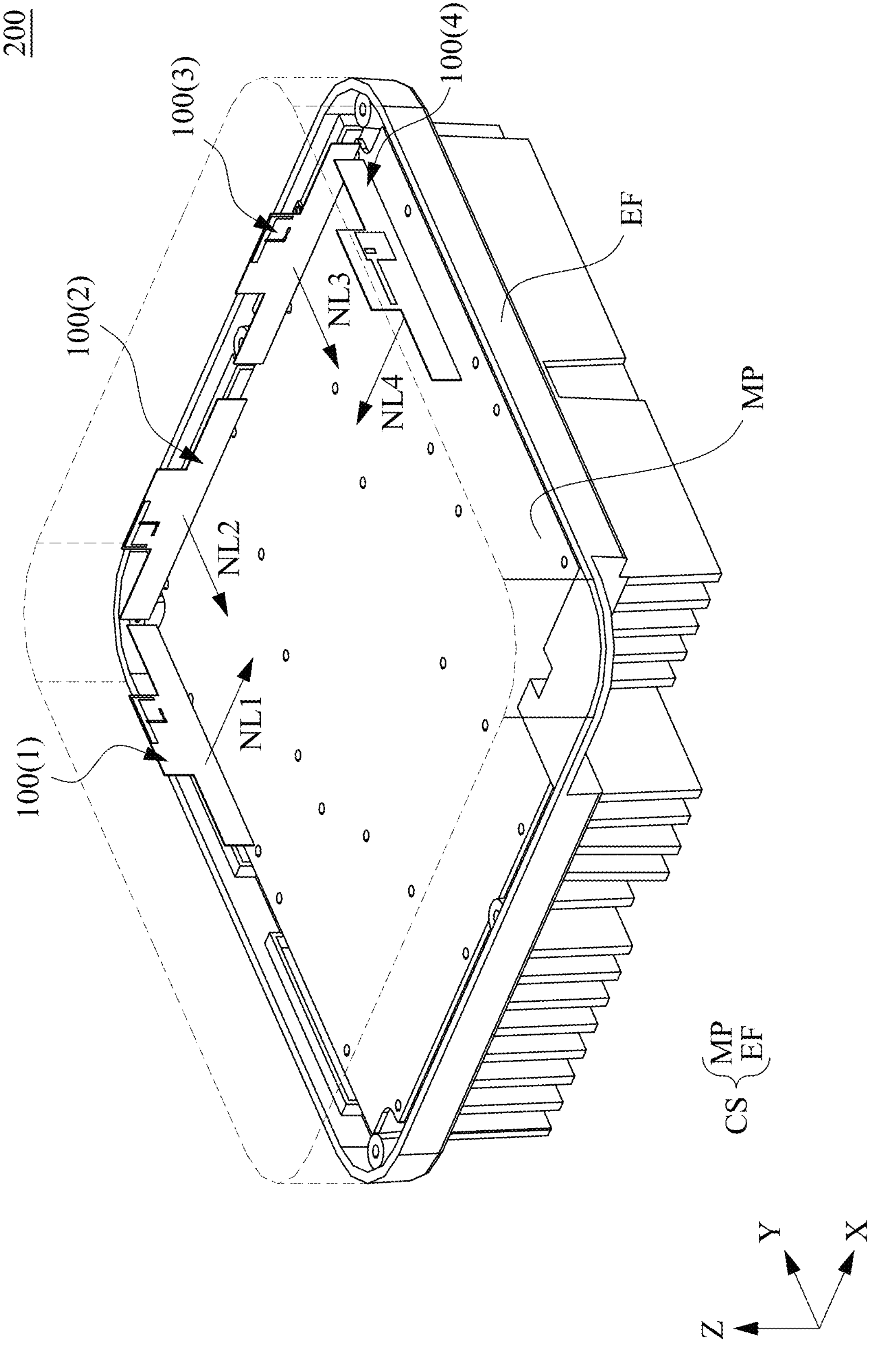
FIG. 13 is a schematic diagram showing the positions of the four antenna structures in the casing according to some embodiments of the disclosure.

Reference is made to FIG. 13 together, which is a schematic diagram showing the positions of the four antenna structures 100(1)-100(4) in the casing CS according to some embodiments of the disclosure. As shown in FIG. 13, the antenna device 200 includes antenna structures 100(1)-100(4) and the casing CS. The antenna structures 100(1)-100(2) in the antenna device 200 can be disposed on the metal plane MP perpendicular to each other, the antenna structure 100(1) is adjacent to the antenna structure 100(2), and the antenna structures 100(1)-100(2) can all be adjacent to the casing edge EF. The angle between the normal directions NL1-NL2 of the respective planes of the antenna structures 100(1)-100(2) is 90 degrees.

Furthermore, the antenna structures 100(2)-100(3) in the antenna device 200 can be disposed parallel to each other on the metal plane MP, the antenna structure 100(2) is adjacent to the antenna structure 100(3), and the antenna structures 100(2)-100(3) can all be adjacent to the casing edge EF. An angle between normal directions NL2-NL3 of respective planes of the antenna structures 100(2)-100(3) is 0 degree.

Furthermore, the antenna structures 100(3)-100(4) in the antenna device 200 can be disposed on the metal plane MP perpendicular to each other, the antenna structure 100(3) is adjacent to the antenna structure 100(4), and the antenna structures 100(3)-100(4) can all be adjacent to the casing edge EF. An angle between normal directions NL3-NL4 of respective planes of the antenna structures 100(3)-100(4) is 90 degrees.

Furthermore, the antenna structures 100(1) and 100(4) in the antenna device 200 can be disposed parallel to each other on the metal plane MP, and the antenna structures 100(1) and 100(4) can all be adjacent to the casing edge EF. An angle between normal directions NL1 and NL4 of respective planes of the antenna structures 100(1) and 100(4) is 180 degrees.

Figure 14:
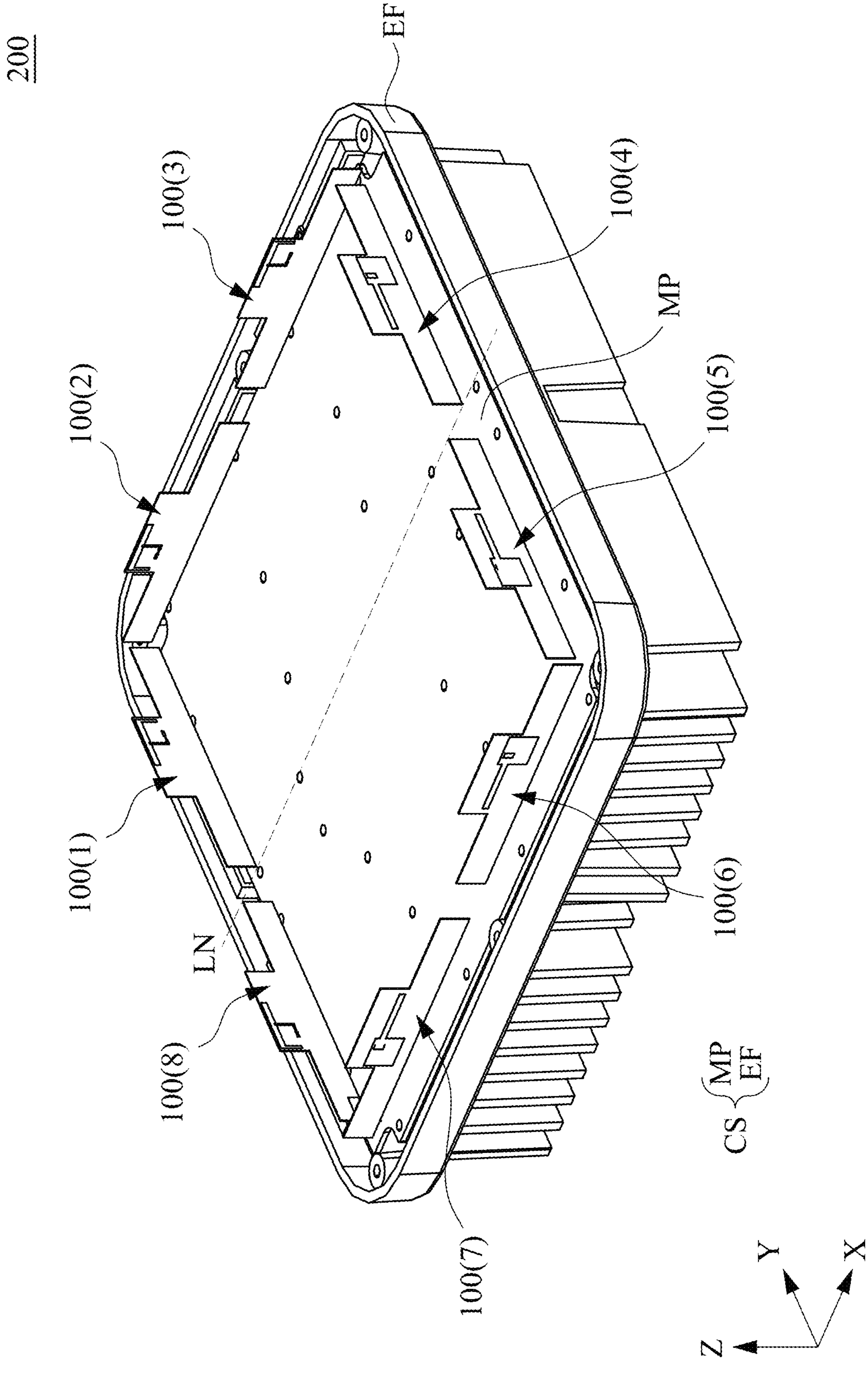
FIG. 14 is a schematic diagram showing the positions of the eight antenna structures in the casing according to some embodiments of the disclosure.

Reference is made to FIG. 14 together, which is a schematic diagram showing the positions of the eight antenna structures 100(1)-100(8) in the casing CS according to some embodiments of the disclosure. As shown in FIG. 14, the antenna device 200 includes antenna structures 100(1)-100(8) and the casing CS. A disposition method of the antenna structures 100(1)-100(4) is the same as the disposition method of the antenna structures 100(1)-100(4) in FIG. 13. In addition, based on the disposition of the antenna structures 100(1)-100(4), the antenna structures 100(8)-100(5) are disposed in a mirror image taking a line segment LN as a reference.

Figure 15:
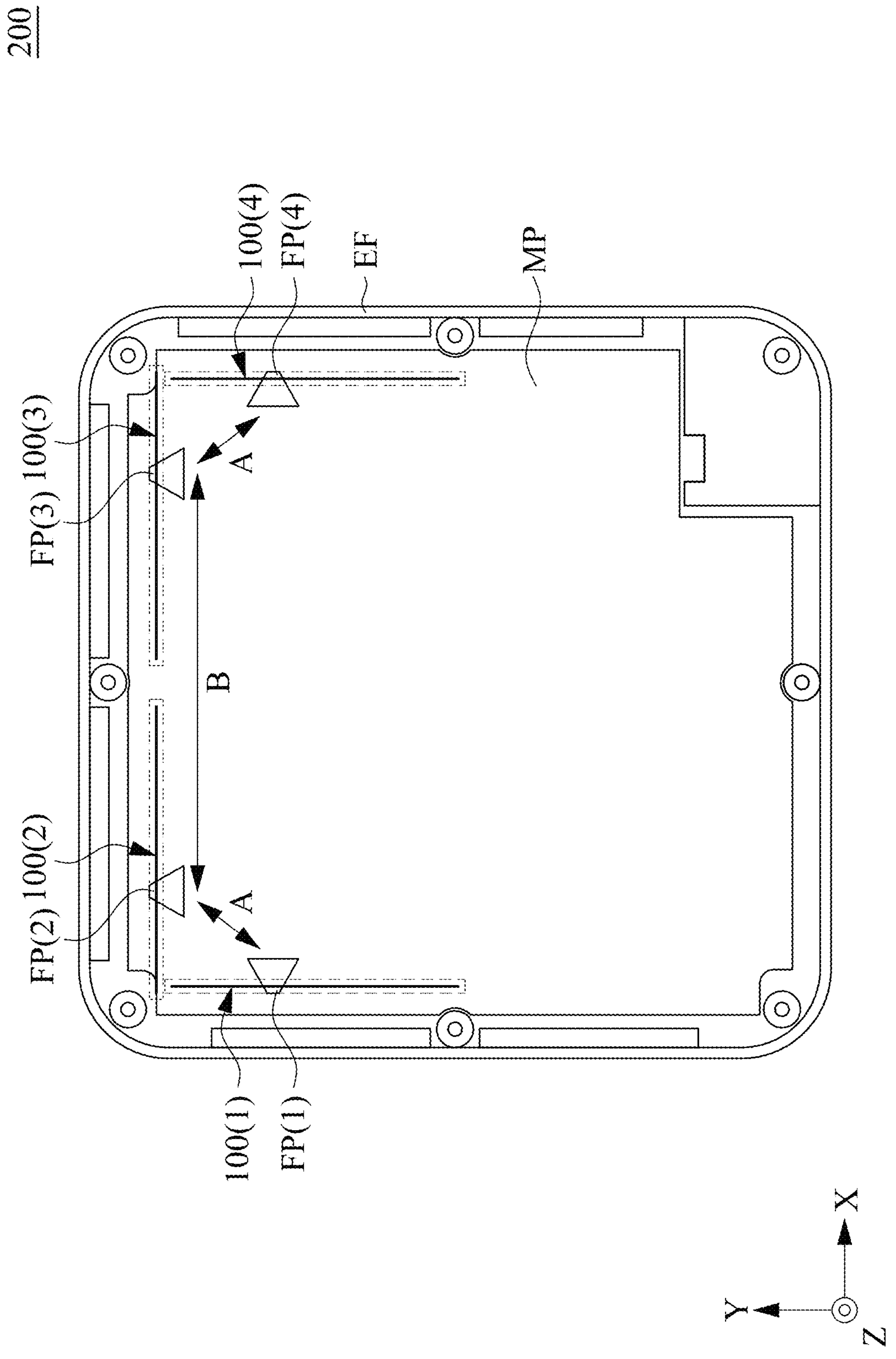
FIG. 15 together, which is a schematic diagram of distances between the four antenna structures shown in some embodiments of the disclosure.

The distance between the antenna structures is described below with a practical example. Reference is made to FIG. 15 together, which is a schematic diagram of distances A and B between the four antenna structures 100(1)-100(4) shown in some embodiments of the disclosure. As shown in FIG. 15, the distance A between a feed-in point FP(1) of the antenna structure 100(1) and a feed-in point FP(2) of the antenna structure 100(2) is 53.49 mm, the distance B between the feed-in point FP(2) of the antenna structure 100(2) and the feed-in point FP(3) of the antenna structure 100(3) is 133.5 mm, and the distance A between the feed-in point FP(3) of the antenna structure 100(3) and the feed-in point FP(4) of the antenna structure 100(4) is 53.49 mm.

It should be noted that configurations of the above-mentioned antenna structures can all meet the requirement that the isolation is more than 20 dB.

In summary, the disclosed antenna structure and antenna device can resonate the larger frequency band to meet the operating frequency band of the fifth generation wireless communication technology. In addition, the antenna structure and antenna device disclosed in the disclosure only need the simple inverted-F antenna structure to meet the operating frequency band of the fifth generation wireless communication technology, and do not require complex antenna structures, which will greatly reduce the cost of the antenna. Furthermore, the required operating frequency band can be adjusted only by adjusting the length of the radiating body of the antenna structure or the length of the ground branch of the ground plane, which will greatly increase the convenience of antenna design. In addition, the antenna structure and the antenna device disclosed herein can optimize the radiation pattern coverage rate of the main radiation area for the frequency band of interest.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An antenna structure, comprising:
- a substrate, comprising a first surface and a second surface opposite to the first surface;
- a ground plane, disposed on the first surface, wherein the ground plane comprises a ground branch; and
- an antenna element, disposed on the second surface, wherein the antenna element comprises:
  - a feed-in body, configured for receiving a feed-in signal, wherein projection of a part of the feed-in body to the first surface overlaps with the ground plane;
  - a radiating body, comprising a first radiating part and a second radiating part connected to the first radiating part, wherein the feed-in body is connected between the first radiating part and the second radiating part, the first radiating part and the second radiating part are parallel to the ground branch, and lengths of the first radiating part and the second radiating part are equal; and
  - a short circuit part, connected to the second radiating part, configured for connecting the ground plane through a via hole, wherein the ground branch resonates with the feed-in signal to generate a first frequency band, the first radiating part and the second radiating part resonate with the feed-in signal to generate a second frequency band, and the first radiating part resonates with the feed-in signal to generate a third frequency band.

2. The antenna structure of claim 1, wherein the third frequency band is higher than the second frequency band, and the second frequency band is higher than the first frequency band.

3. The antenna structure of claim 1, wherein a length of the ground branch is a quarter wavelength of the first frequency band.

4. The antenna structure of claim 1, wherein the lengths of the first radiating part and the second radiating part both are a one-eighth wavelength of the second frequency band.

5. The antenna structure of claim 1, wherein a minimum distance is between projection of the first radiating part to the first surface and the ground branch, and a length of the minimum distance is a difference between a quarter wavelength of the third frequency band and a one-eighth wavelength of the second frequency band.

6. The antenna structure of claim 1, wherein the antenna element is an inverted-F antenna structure, and the short circuit part is connected to the ground plane through the substrate by the via hole.

7. The antenna structure of claim 1, the substrate comprises a first substrate edge, a second substrate edge, a third substrate edge and a fourth substrate edge, wherein the first substrate edge is perpendicular to the second substrate edge and the third substrate edge, and the first substrate edge is parallel to the fourth substrate edge.

8. The antenna structure of claim 7, wherein a distance between the radiating body and the first substrate edge is smaller than a distance between the radiating body and the fourth substrate edge.

9. The antenna structure of claim 7, wherein a distance between the short circuit part and the second substrate edge is smaller than a distance between the short circuit part and the third substrate edge.

10. The antenna structure of claim 7, wherein a disposition direction of the radiating body is parallel to the first substrate edge and the fourth substrate edge, and is perpendicular to the second substrate edge and the third substrate edge.

11. The antenna structure of claim 7, wherein a disposition direction of the short circuit part is parallel to the second substrate edge and the third substrate edge, and is perpendicular to the first substrate edge and the fourth substrate edge.

12. The antenna structure of claim 7, a distance between an end of the ground branch and the second substrate edge is larger than a distance between the end of the ground branch and the third substrate edge.

13. The antenna structure of claim 7, a disposition direction of the ground branch is parallel to the first substrate edge and the fourth substrate edge.

14. The antenna structure of claim 7, a disposition direction of the ground branch is perpendicular to the second substrate edge and the third substrate edge.

15. The antenna structure of claim 7, wherein a length of the ground branch is a quarter wavelength of the first frequency band.

16. An antenna device, comprising:

a casing, comprising a metal plane and a casing edge; and a first antenna structure, vertically disposed on the metal plane, wherein the first antenna structure is adjacent to the casing edge, wherein the first antenna structure comprises:

a substrate, comprising a first surface and a second surface opposite to the first surface;

a ground plane, disposed on the first surface, wherein the ground plane comprises a ground branch, the ground plane has a ground edge adjacent to the casing, and a separation distance is between the ground edge and the casing;

an antenna element, disposed on the second surface, wherein the antenna element comprises:

a feed-in body, configured for receiving a feed-in signal, wherein projection of a part of the feed-in body to the first surface overlaps with the ground plane;

a radiating body, comprising a first radiating part and a second radiating part connected to the first radiating part, wherein the feed-in body is connected between the first radiating part and the second radiating part, the first radiating part and the second radiating part are parallel to the ground branch, and lengths of the first radiating part and the second radiating part are equal; and a short circuit part, connected to the second radiating part, configured for connecting the ground plane through a via hole, wherein when the separation distance between the antenna element and the metal plane is equal to a preset distance, the ground branch resonates with the feed-in signal to generate a first frequency band, the first radiating part and the second radiating part resonate with the feed-in signal to generate a second frequency band, and the first radiating part resonates with the feed-in signal to generate a third frequency band, wherein the first frequency band, the second frequency band and the third frequency band respectively have a first radiation pattern coverage rate, a second radiation pattern coverage rate and a third radiation pattern coverage rate, when the separation distance between the antenna element and the metal plane is smaller than the preset distance, the first frequency band has a fourth radiation pattern coverage rate, wherein the fourth radiation pattern coverage rate in the first frequency band is higher than the first radiation pattern coverage rate, and when the separation distance between the antenna element and the metal plane is larger than the preset distance, the third frequency band has a fifth radiation pattern coverage rate, wherein the fifth radiation pattern coverage rate is higher than the third radiation pattern coverage rate.

17. The antenna device of claim 16, wherein the third frequency band is higher than the second frequency band, and the second frequency band is higher than the first frequency band.

18. The antenna device of claim 16, further comprising a second antenna structure, wherein the second antenna structure has same structure as the first antenna structure, the substrate of the first antenna structure and a substrate of the second antenna structure are parallel or perpendicular to each other.

19. The antenna device of claim 18, wherein isolation between the first antenna structure and the second antenna structure is more than 20 dB.

20. The antenna device of claim 18, wherein radiation patterns of the first antenna structure and the second antenna structure are approximately hemispherical, and radiation pattern coverage rates of the first antenna structure and the second antenna structure are higher than 80%.

* * * * *